United States Patent [19]

Sumic et al.

[11] Patent Number: 5,329,464
[45] Date of Patent: Jul. 12, 1994

[54] UTILITY LAYOUT DESIGN SYSTEM

[75] Inventors: Zarko Sumic, Kirkland; Todd A. Pistorese, Redmond, both of Wash.

[73] Assignee: Puget Sound Power & Light Company, Bellevue, Wash.

[21] Appl. No.: 855,906

[22] Filed: Mar. 23, 1992

[51] Int. Cl.$^5$ .............................................. G06F 15/20
[52] U.S. Cl. .................... 364/512; 364/492; 364/578; 395/921
[58] Field of Search ............. 364/505, 512, 578, 463, 364/492; 395/919, 921

[56] References Cited

U.S. PATENT DOCUMENTS

| | | | |
|---|---|---|---|
| 4,969,114 | 11/1990 | Herring et al. | 364/570 |
| 5,021,968 | 6/1991 | Ferketic | 364/512 |
| 5,119,317 | 6/1992 | Narikawa et al. | 364/512 |
| 5,150,295 | 9/1992 | Mattingly | 364/420 |
| 5,193,185 | 3/1993 | Lanter | 395/600 |

OTHER PUBLICATIONS

Comparison of Several Computerized Distribution Planning Methods Willis et al.; IEEE Transaction on Power Apparatus and Systems; vol. PAS-104, No. 1; Jan. 1985; pp. 233-240.
Morehouse; The Role of Semantics in Geographic Data Modelling; 4th International Symposium on Spatial Data Handling; 1990; Zurich, Switzerland; vol. 2, pp. 689-698.
Morehouse; The ARC/INFO Geographic Information System; Computers and Geosciences; vol. 18, No. 4, pp. 435-441; 1992.
D. Maidment and D. Djokic, *Creating an Expert Geographic Information System: the Arc-Nexpert Interface*, paper, 13 pages; Nov. 1990.
D. Maidment and T. Evans, *Expert GIS*, paper, 5 pages; Aug. 1991.
A. Meyer and B. Dwolatsky, "The Effective Computer Generation of Designs for Township Electrical Distribution," *IEEE Journal*, Feb. 1991, pp. 659-663.
Z. Sumic and T. Pistorese, *Intelligent Decision Support System for Automated Electrical Plat Design*, abstract, 1 page; no date.

*Primary Examiner*—Thomas G. Black
*Assistant Examiner*—Michael Zanelli
*Attorney, Agent, or Firm*—Christensen, O'Connor, Johnson & Kindness

[57] ABSTRACT

A method of designing a utility distribution system. The method begins with lot data that geographically defines lots in an area to which the utility will be provided. The lot data is stored in a computer in a geographic information system (GIS). The lot data is then computer processed to determine routing data identifying a network of potential utility supply routes, and to produce site data identifying a plurality of placement sites for distribution devices such as transformers for an electrical distribution system. The routing and site data is also stored in the computer. The lot potential routing and site data is then mapped into equivalent expert system objects, and processed using an expert system to produce actual routing data specifying, for each lot, a route along which the lot can be connected to a distribution device, and the size of the required conductor. The routing data may then be mapped back into the GIS.

18 Claims, 9 Drawing Sheets

UTILITY LAYOUT DESIGN SYSTEM

FIELD OF THE INVENTION

The present invention provides a semi-automatic system for designing a utility distribution system. In particular, the invention provides a computerized decision support system for designing the physical siting of distribution equipment and the routing of conductors and the like, for providing electrical, gas, water, sewer, or other utilities to end users.

BACKGROUND OF THE INVENTION

FIG. 1 is a map showing the layout of streets and lots for a hypothetical new residential development. The map covers an area 10 that includes streets 12 and a plurality of lots 14. The problem addressed by this invention is the selection of distribution equipment sites and routing corridors for providing utilities such as electricity, gas, etc. to the lots in area 10. The description to follow will use the provision of underground electrical supply to illustrate the principles of the invention. However, it will be apparent that the techniques described can be applied to distribution systems for other utilities.

The design of an underground electrical distribution system for a new residential development is a common task for electrical utility engineers. This type of design is presently carried out manually, using rules of thumb and experience gained from previous problem solutions. The result is that the distribution system is usually overdesigned, resulting in a waste of capacity.

Since the early days of computers, there have been attempts to computerize some of the activities in the process of distribution system design. Some progress has been achieved in automating routine tasks, such as substation wiring diagrams. Computerized methods have also been developed for well-defined engineering procedures, such as power flow and voltage drop calculations, and fault analysis. Relatively little progress has been made, however, in automating the important and difficult issues of transformer siting and the routing of secondary wiring. Transformers are used to convert the "primary" 12.5 kV electrical supply into the "secondary" 120 V supply that will be delivered to the individual lots via "secondary wiring." Typically, there will be one transformer for every 5 to 15 lots, and the transformer needs to be sited appropriately with respect to the lots that it will serve. In addition, the secondary wiring connecting each lot to its transformer needs to be routed and sized appropriately.

FIG. 2 represents an example of a solution to the design problem posed by FIG. 1. In FIG. 2, a plurality of transformers 20 have been positioned in selected lots. Collectively, the transformers serve all of the lots in area 10 except shaded lots 16 that do not have frontage on one of the streets 12 in the plat, it being assumed that such lots are outside the scope of the design problem. Each transformer converts 12.5 kV primary voltage into 120 V secondary voltage, and delivers secondary voltage to a plurality of lot supply points 22 via secondary wiring 24. In some cases, the connection is via a handhole 26 that is a distribution device for secondary voltage. The present invention provides a computer based method for the generation of a design solution, such as the one shown in FIG. 2, in light of the numerous constraints that are typically placed on such a solution.

Transformer siting and the routing of secondary wiring are ill-structed and open-ended problems that are difficult to automate or computerize with conventional approaches such as operational research or CAD. One difficulty lies in the need to process spatial data such as lot and street placement, existing utility corridors, natural obstacles, etc. A second problem is that siting and routing involves multiple, interdependent goals and constraints that make the design problem difficult to formulate. To apply conventional optimization routines from operational research theory, a well-defined objective function must be derived in an algorithmic form. However, due to the ill-structured and open-ended nature of the utility distribution problem, it is not possible to derive an objective function without sacrificing decision factors. These facts make conventional procedural optimization methods inappropriate for solving utility distribution design problems.

SUMMARY OF THE INVENTION

As stated above, one of the complexities inherent in the electrical distribution system design is the need to process geographically reference data. However, many utilities have already implemented computer systems for storing and retrieving geographic data. Such systems are referred to as automated mapping and facilities management systems, and typically reside within a geographic information system (GIS) as a part of a database managed by a utility company. The GIS forms a repository from which relevant geographic information may be retrieved for design purposes. The utility distribution design system of the present invention is therefore based upon data available in a typical GIS.

Unfortunately, the problem of secondary routing does not lend itself to efficient solution through common procedural programming languages. The present invention therefore approaches the secondary routing problem by means of an expert system, that mimics the rule-of-thumb analysis that would be used by a human designer. However, the objects or data structures necessary for a rule-based expert system are different from the data structures used for spatial analysis in a GIS. Therefore to combine GIS and expert system techniques, it is necessary to provide for the mapping or bringing of data describing a particular design problem between the two domains.

In a preferred embodiment, the design method of the present invention commences with the provision of lot data that geographically defines the lots in the area to which the utility will be provided. The lot data is stored in a computer in a geographic information system (GIS). The lot data is then processed by computer to produce actual siting data specifying a plurality of placement sites in the area for distribution devices, and the actual siting data is also stored on the computer. Next, the lot and site data is mapped into equivalent expert system data in a format suitable for processing by an expert system. The expert system data is then processed using the expert system, to produce routing data specifying, for each lot, a route along which the lot can be connected to a distribution device. The routing data may then be remapped back into the GIS.

In a preferred embodiment, the step of computer processing the lot data comprises defining potential routing corridors and potential placement sites within the area, to produce potential site and potential routing data, and storing the potential site and potential routing data in the computer. The potential routing data may include corridor data specifying potential routes through lots, and crossing data specifying potential routes that cross streets. Once such data has been produced, the actual siting data may be provided by first grouping the lots into clusters, and then selecting one or more distribution device sites within each cluster. The expert system data may comprise a plurality of expert system objects, each object corresponding to one of the lots. The step of processing the expert system data may comprise the additional step of producing sizing data for each lot.

For the illustrated case in which the utility comprises an electrical utility, the distribution devices comprise transformers for converting primary voltage into secondary voltage, and the routing data specifies routes along which the lots can be connected to distribution devices via secondary wiring. The distribution devices may also include handholes for connecting a group of lots to a transformer.

DETAILED DESCRIPTION OF THE PREFERRED EMBODIMENT

Figure 3:
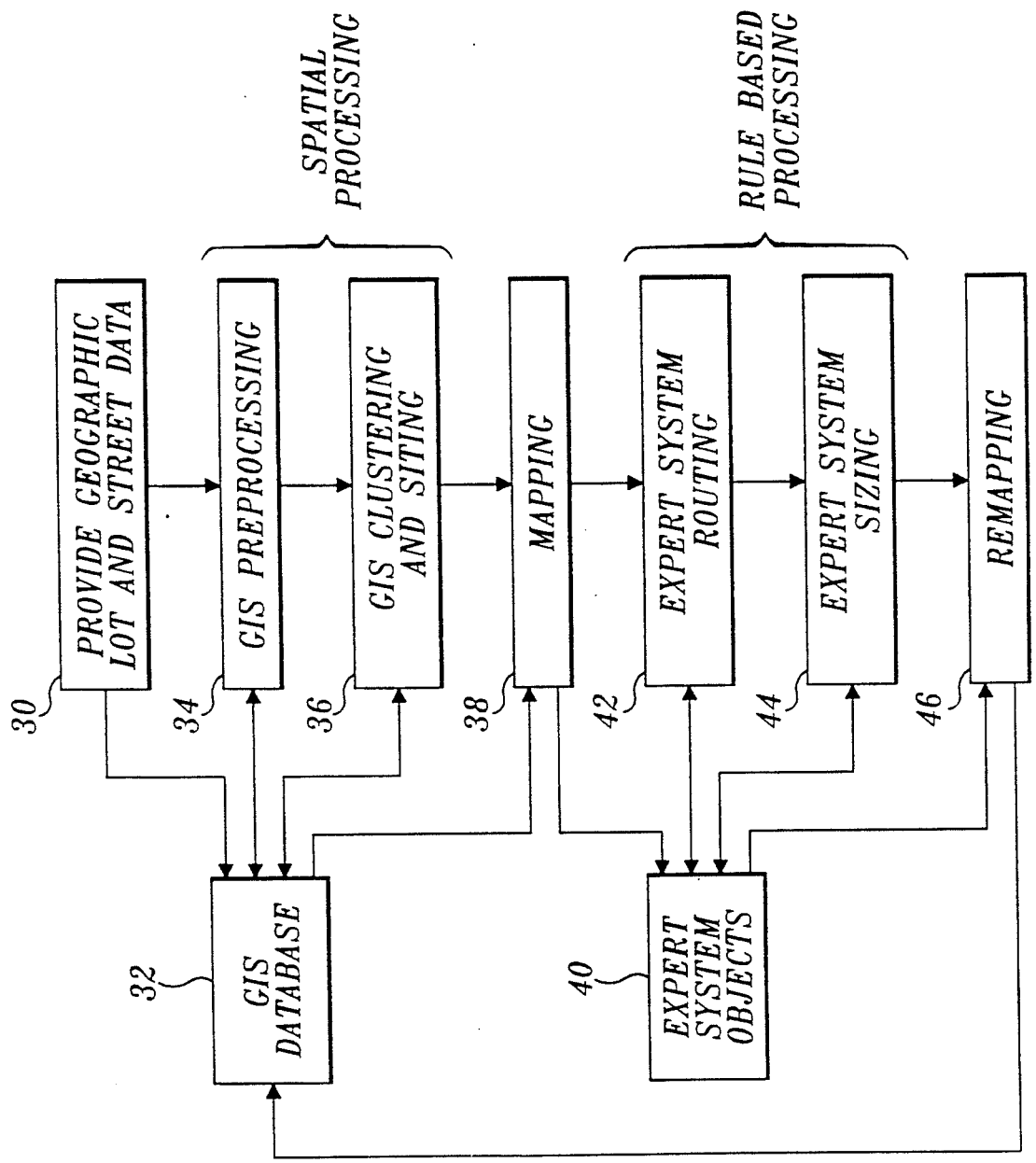
FIG. 3 is a block diagram showing the principal processing steps of the present invention.

FIG. 3 presents an overview of a preferred embodiment of the method of the present invention, for laying out a utility distribution system. In FIG. 3, blocks on the left hand side of the figure represent data or information, while blocks on the right hand side of the figure represent computer processes. The method of FIG. 3 begins with step 30, wherein geographic lot and street information is provided, and stored in GIS database 32. At this point, the GIS database generally corresponds to the information shown in FIG. 1. Geographic information systems will be described in more detail below. However in general, data in a GIS database is stored in units known as coverages. Each coverage can be imagined to consist of one sheet of a composite overlay that represents a geographical area. The lot and street information is stored in a single GIS coverage.

In many cases, the lot and street data provided in step 30 will be derived from a preexisting GIS database covering the area in question. Typically, the preexisting database will include a large amount of information not needed for the design of a utility distribution system. Thus for the present invention, only the locations of the lot and street boundaries need to be extracted into GIS database 32.

The first major step in carrying out the present invention comprises preprocessing the GIS database, in step 34. The principal function of preprocessing is to identify potential transformer placement sites, and potential routing corridors for secondary wiring. In a preferred embodiment, the preprocessing step 34 adds data to the existing coverage in GIS database 32, and adds additional coverages as described below. Preprocessing is an automatic computer step, and in general proceeds without interaction with a user or operator.

After preprocessing, the method of the present invention proceeds to step 36, wherein the lots are grouped into clusters, a cluster being a collection of lots that will be served by a single transformer. A transformer site is then selected in each cluster. Step 36 involves interaction with the user, to obtain approval of an automatically generated design, or to provide adjustments to the clustering and siting suggested by the computer. Information concerning the clustering and siting is stored in the GIS database.

The next major processing step is the mapping 38 of the data in GIS database 32 into a plurality of expert system objects 40. Each object corresponds to one of lots 14 shown in FIG. 1. This mapping permits the expert system objects to be processed by an expert system, in steps 42 and 44, to determine the routing and sizing of secondary wiring. The routing and sizing information is stored in expert system objects 40. Once expert system steps 42 and 44 are complete, the final step is a remapping 46 of the expert system objects back into GIS database 32. This produces a solution of the type illustrated in FIG. 2. The solution comprises data describing the placement of transformers, and the routing and sizing of secondary wiring to each lot. The overall process outlined in FIG. 3 permits one to begin with data in its most readily available form (a GIS database), but to process such data (after mapping) using the technique best suited to the secondary routing problem, i.e., an expert system.

GIS SYSTEMS

Geographic information systems have recently emerged from a stage of exploratory development into a mature technology that is used in many diverse applications that require spatial information processing. The main difference between a GIS and other types of graphic software is that a GIS integrates database management, computer graphics, and spatial modeling, and also includes analysis tools that allow the user to identify spatial relationships between map features. In a GIS, data are organized as primitive geographic objects, i.e., points, lines (also referred to as arcs), and polygons. A point is recorded as a single (x,y) location in a Cartesian coordinate system; lines are recorded as a series of ordered (x,y) pairs; and polygons are recorded as a series of lines that enclose an area or, equivalently, as a series of points that define the lines that enclose the area.

The points at the ends of a line are referred to as nodes. A line is given direction by defining one node as the from-node, and the other node as the to-node. By determining whether two lines share a common node, the GIS can determine whether the lines are connected to one another. The directionality of lines permits the GIS to define the left and right side of each line, and to maintain a list of the polygons on the left and right sides of each line. The GIS can thus determine that polygons sharing a common line are adjacent to one another.

The primitive geographic objects (points, lines, and polygons) and their spatial relationships are stored in a GIS in separate files managed by a Database Management System (DBMS). The GIS also stores information describing attributes of the primitive geographic objects, in so-called feature attribute tables that are also managed by the DBMS. Examples of feature attribute tables are given below.

The data in a GIS is logically organized into layers or themes of information. Each layer is called a "coverage," and consists of topologically linked geographic objects and their associated attributes. For example, in a preferred implementation of the present invention, there is one coverage comprising polygons representing lots and roads in the area to be supplied with electrical power. Physically, all data contained in a coverage is stored in one directory as a set of files containing feature attribute tables, coordinate and topology files, and cross-reference files used by the DBMS. Information contained in various layers can be analyzed separately, or can be combined to create new coverages to assist the user in decision making.

A typical GIS also includes a fourth generation language having a set of functions and macros for performing spatial analysis and cartographic data manipulation. This language may be used to implement the preprocessing, clustering and siting, and mapping steps of the present invention, as described below. For the purpose of the present invention, a suitable GIS is the ARC/INFO GIS available from Environmental Systems Research Institute, Inc., and the description below will be based upon the conventions used in ARC/INFO. However, other GIS software may also be used.

PREPROCESSING

Figure 4:
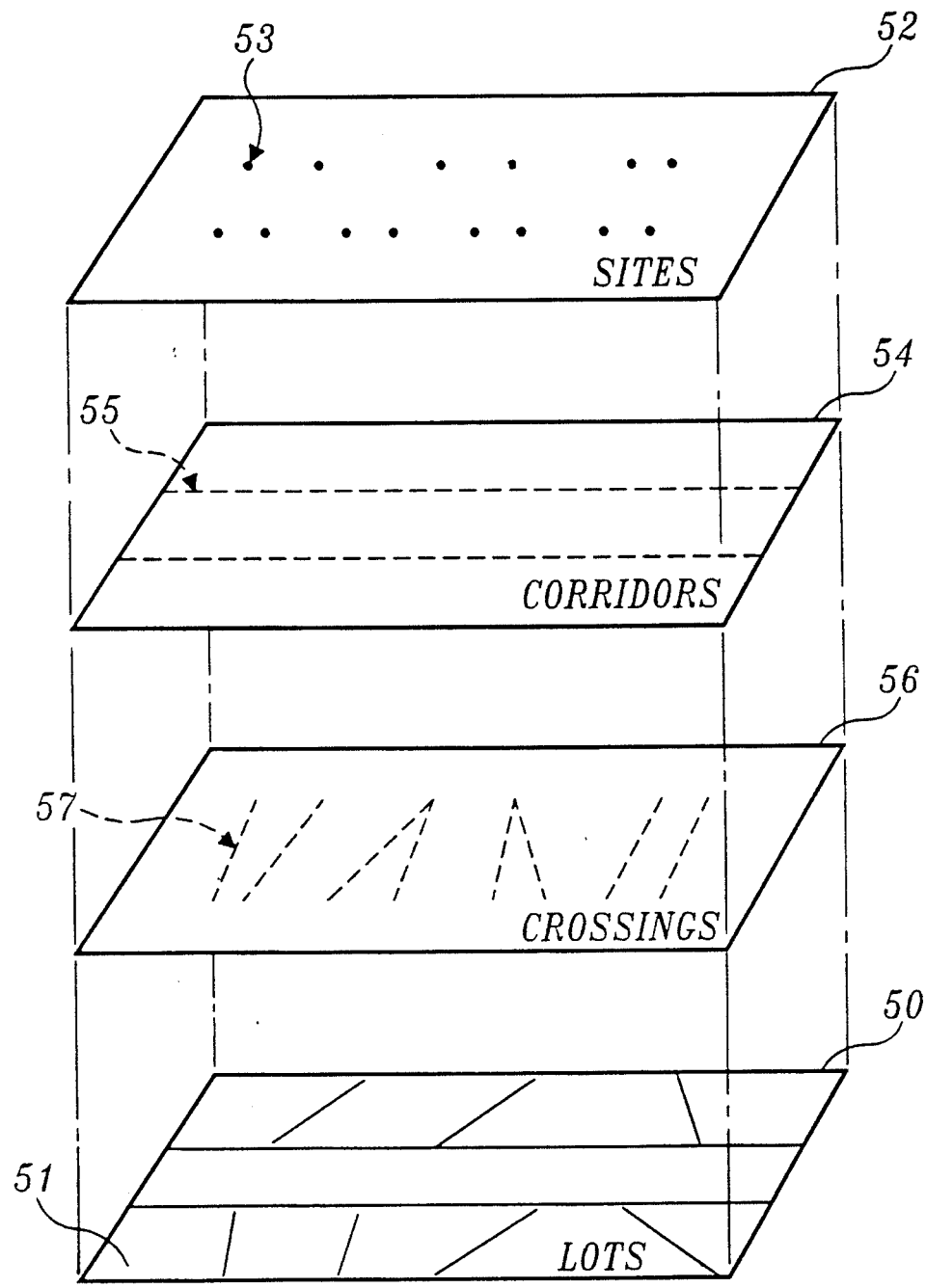
FIG. 4 schematically illustrates the combination of coverages in a GIS.

In a preferred embodiment, the preprocessing step makes use of the four GIS coverages schematically illustrated in FIG. 4. The geographic data defining lots and streets, provided in step 30 in FIG. 3, is placed in a LOT coverage 50 that defines the boundaries of the lots and streets in the geographic area to be laid out according to the present invention. The preprocessing step creates three new coverages: SITE coverage 52, CORRIDOR coverage 54, and CROSSING coverage 56. LOT coverage 50 comprises a plurality of polygons 51, each polygon representing either a lot or a street. SITE coverage 52 comprises a set of points 53 that identify potential transformer placement sites. CORRIDOR coverage 54 comprises a set of lines 55 that represent potential routing corridors for secondary wiring that do not cross a street. CROSSING coverage 56 comprises a set of lines 57 that represent street crossing corridors for the secondary wiring. All four coverages represent the same geographic area, such that the coverages can be imagined as a set of overlays that can be superimposed on one another.

In addition to the coverages shown in FIG. 4, an additional OBSTACLES coverage may also be generated, and used as part of the design process. The OBSTACLES coverage is made up of polygons that represent areas containing water and sewer mains and stubouts, gas mains, large rocks, ponds, very steep terrain, and similar features that would prevent the placement of a transformer or the routing of secondary wiring. The use of the OBSTACLES coverage is further described below.

LOT coverage 50 may be derived from the GIS portion of a preexisting database owned or managed by a utility. Alternately, the LOT coverage can be derived from paper maps, from maps drawn electronically and stored as CAD files, or from digitized or scanned maps. In one preferred embodiment, the format and content of the feature attribute table associated with the LOT coverage is as follows:

TABLE 1

| LOT Coverage Polygon Attribute Table | |
|---|---|
| Name | Description |
| Lot-ID | Unique identifier |
| Area | Area of lot |
| Perimeter | Perimeter of lot |
| Connected | Supplied by the user |
| Street | Supplied by the user |
| Cul-de-sac | Supplied by the user |
| SideStr | Side of the Street |
| LNeigh | Left neighbor lot ID |
| RNeigh | Right neighbor lot ID |
| LCorner | Left corner Site ID |
| RCorner | Right corner Site ID |
| Corridor-ID | Corridor ID |
| Cluster | Cluster number ID |
| SODD | Side of Distribution Device |
| CondLength | Length of secondary conductor |
| CondSize | Size of secondary conductor |

At the beginning of the preprocessing step, each lot polygon has only three basic attributes: area, perimeter, and lot ID. The remaining attributes are input or determined during subsequent processing, as further described below. Each polygon comprises a plurality of lines, and each line comprises a plurality of points. The GIS automatically stores and manages the tables that define such lines and points for each polygon.

Figure 1:
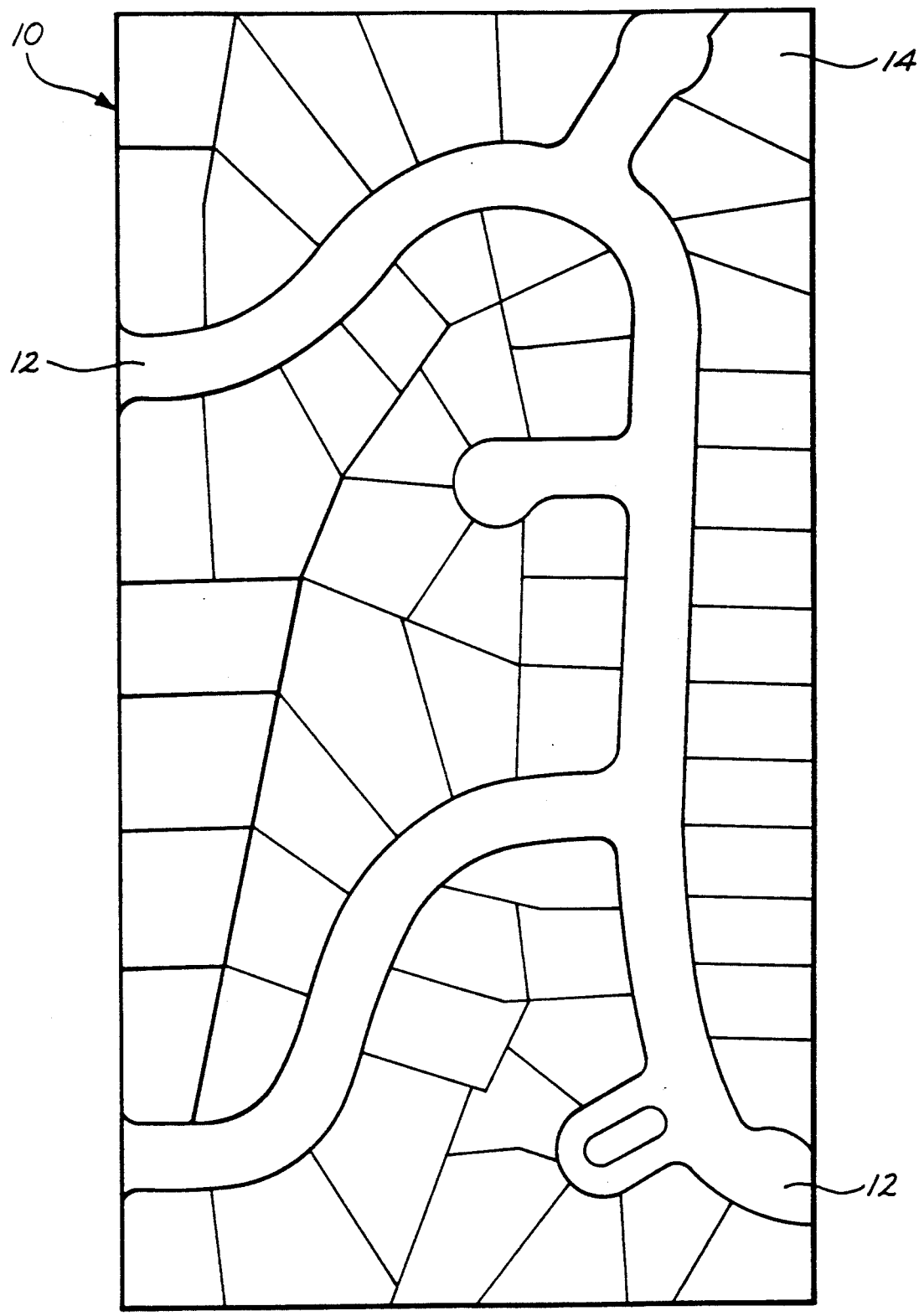
FIG. 1 is a map showing the lots in an area to be provided with an electrical distribution system.
Figure 5:
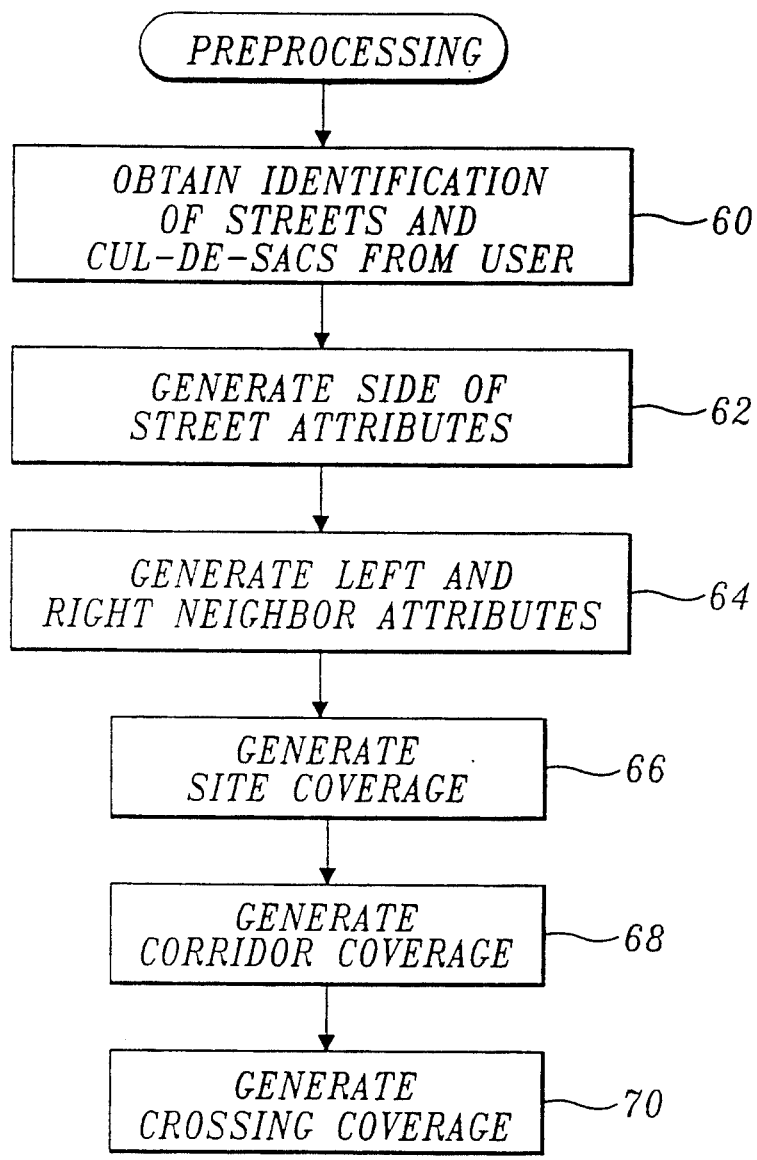
FIG. 5 is a high level flow chart of the preprocessing step.

The steps performed during preprocessing are outlined in FIG. 5. It will usually be most convenient to implement these steps on the computer in which the GIS is stored, typically using a fourth generation programming language provided as part of the GIS. The first preprocessing step 60 is to obtain from the user an identification of which polygon in the LOT coverage corresponds to the street. Referring to FIG. 1, the user would identify polygon 12 as the street, and the Street attribute (see Table 1) for this polygon would be set accordingly. The user at this point can also indicate that certain polygons are not connected to the distribution system. Examples would be polygons 16 shown in FIG. 2. For such polygons, the Connected attribute would be set accordingly. At this time, the user also specifies the Cul-de-sac attribute, which is further explained below.

In step 62 in FIG. 5, the side of street attribute (SideStr) is generated for each connected polygon in the LOT coverage. The purpose of the SideStr attribute is to identify a set of lots that can be served from a single transformer, without crossing a street. To obtain consistency when dealing with cul-de-sacs where lots on opposite sides of a cul-de-sac are served by crossing rather than going around, the bottom of each cul-de-sac is "opened," to create an artificial street crossing at the innermost end of the cul-de-sac.

Figure 2:
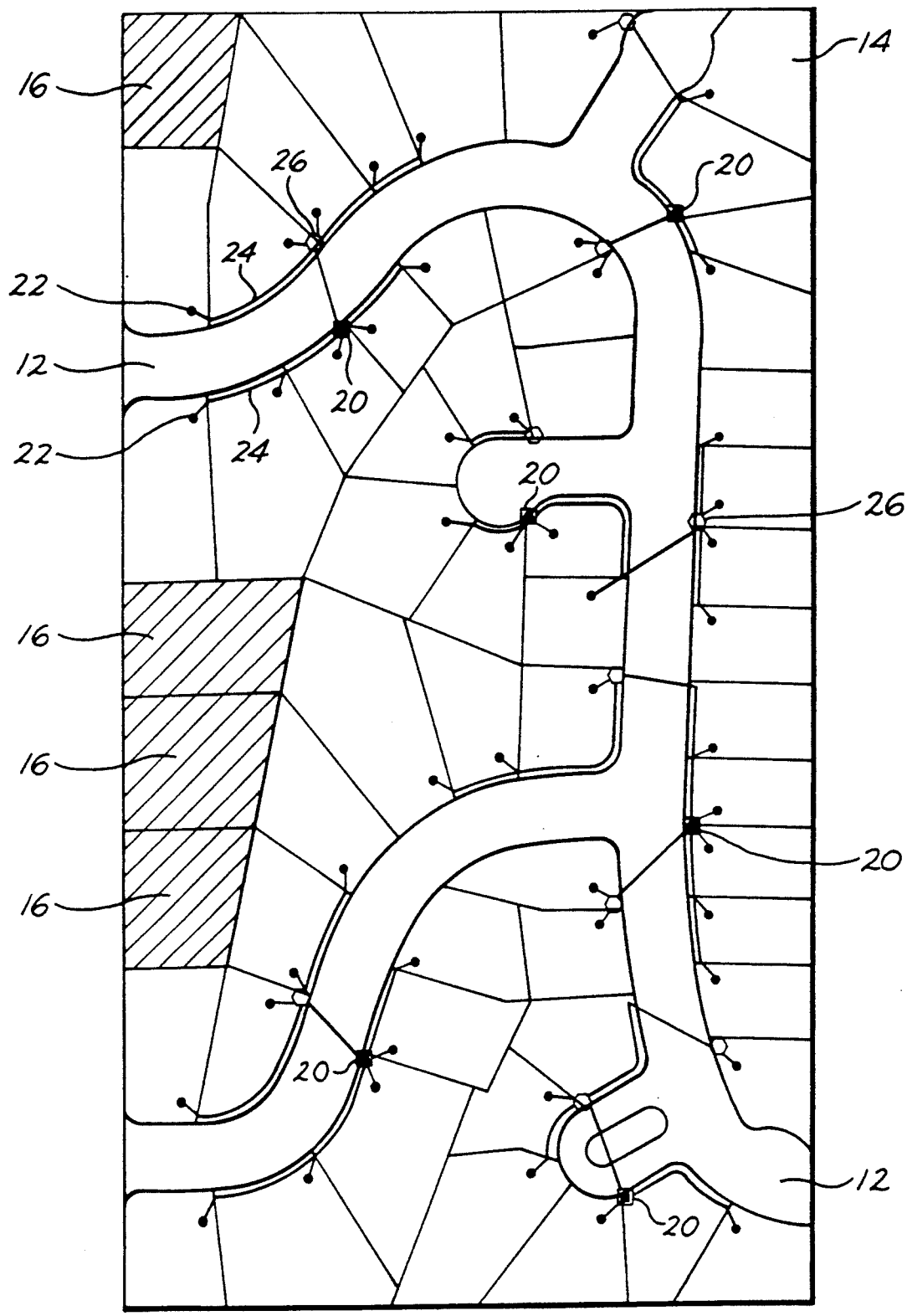
FIG. 2 is a map of the area shown in FIG. 1, showing an example of a solution to the electrical distribution problem.
Figure 6:
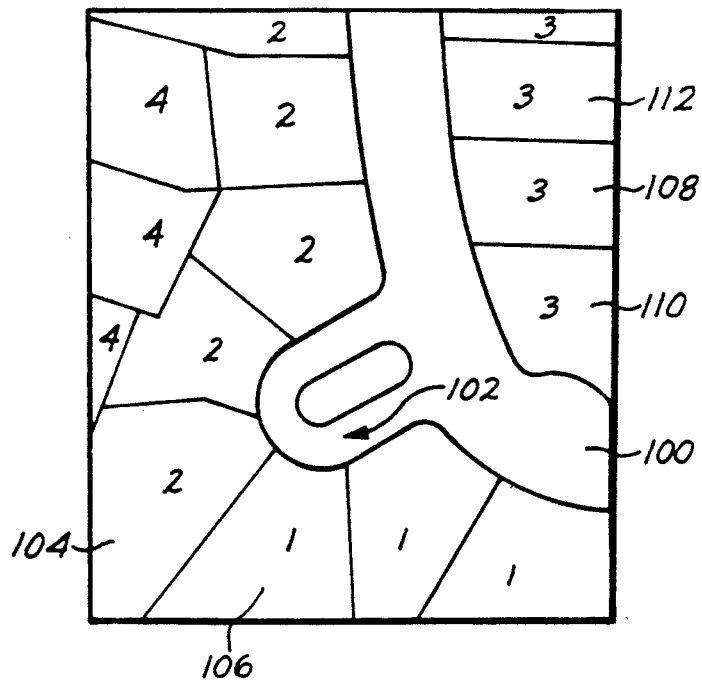
FIG. 6 is a partial map illustrating generation of side of the street attributes.

Assignment of the SideStr attribute and the opening of a cul-de-sac are illustrated in FIG. 6, which depicts a portion of the map of FIGS. 1 and 2. This portion includes street 100 and a plurality of lots, the streets including a cul-de-sac 102. During step 60, the user would set the cul-de-sac attribute for lots 104 and 106, thereby artificially "opening" the cul-de-sac 102. The SideStr attribute is then generated for all lots by first identifying each street frontage line, i.e., each line that has street polygon 100 on either its left or right side. Next, frontage lines that are connected to one another are identified, and the lots corresponding to each group of connected frontage lines are assigned a common SideStr attribute code. Examples of attribute codes generated in this way are shown within the lots in FIG. 6. All lots having the same SideStr attribute code are considered to be on the same side of the street.

The next preprocessing step is the generation of the LNeigh (left neighbor) and RNeigh (right neighbor) attributes, in step 64 of FIG. 5. Left and right are defined as one faces the street. Thus in FIG. 6, for lot 108, the left neighbor is lot 110, while the right neighbor is lot 112. These attributes are generated from the left polygon ID and right polygon ID that are automatically created for each line by the GIS when the LOT coverage is created. The main step is identification of lot boundary lines that have a node in common with one of the street frontage lines. The frontage lines have already been identified during step 62.

The next preprocessing step is the generation of site coverage 52 schematically illustrated in FIG. 4. The site coverage consists of points 53 that represent potential placement sites for transformers or handholes. The contents of the site coverage point attribute table are illustrated in Table 2.

TABLE 2

| SITE Coverage Point Attribute Table | |
|---|---|
| Name | Description |
| Site-ID | Unique identifier |
| Lot-ID | Pointer to the lot that contains the site |
| Crossing-ID | Pointer to the crossing that originates from that site |
| Opposite-ID | Pointer to the site on the opposite side of the crossing |
| L-R | L if the site is in the left and R if the site is in the right lot corner |
| Status | F = site can be used; O = obstacle present; T = transformer sited; H = handhole sited |
| Used | Flag used during secondary routing |

Figure 7:
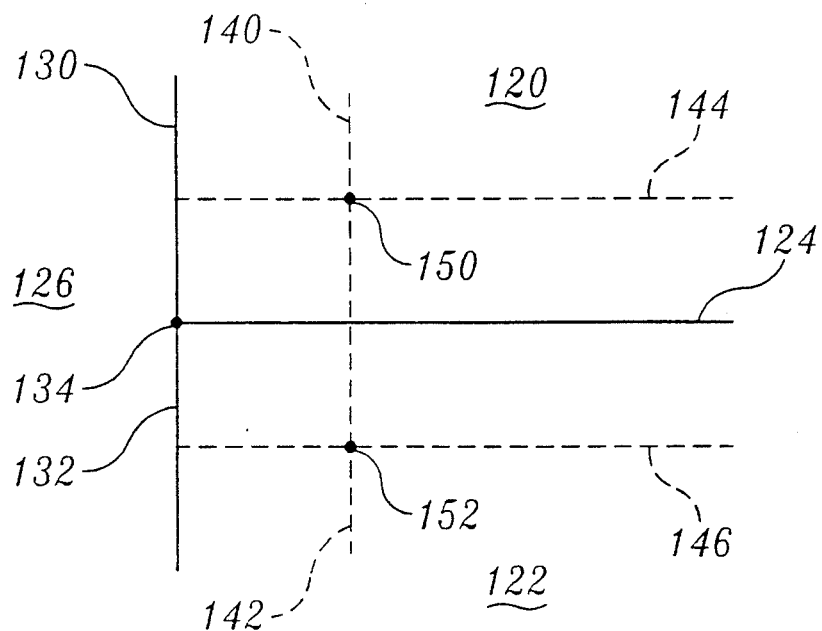
FIG. 7 is a diagram illustrating a preferred method for determining transformer placement sites.

In a preferred embodiment of the invention suitable for electrical underground distribution design, sites 53 are positioned based upon a rule that a transformer or a handhole can be placed at the front corner of a lot (i.e., at one of the corners adjacent to the street), at the center line of a utility easement (typically 10 feet wide) that extends along the street frontage line, within a prescribed distance from the boundary between the lot and an adjacent lot. Referring to FIG. 7, one first constructs lines 140 and 142 spaced a fixed distance (e.g., five feet) from frontage lines 130 and 132. Lines 144 and 146 are then constructed, spaced to either side of lot boundary line 124. The intersections of these lines at nodes 150 and 152 are the transformer placement sites. Intersections that fall within streets are ignored. In Table 2, the Lot-ID attribute identifies the lot (polygon) in which the site is located, while the L-R attribute indicates whether the site is in the left or right front corner of the lot. Other attributes in Table 2 will be discussed below.

Referring again to FIG. 5, step 68 generates CORRIDOR coverage 54 shown in FIG. 4, the CORRIDOR coverage comprising lines 55 that represent the center lines of trenches in which secondary wiring 24 (FIG. 2) can be routed. For the purpose of the present embodiment, it will be assumed that all such corridors will be created in the utility easements extending along each lot frontage line, such as those represented by lines 140 and 142 previously generated in step 66. Table 3 below shows the contents of the CORRIDOR coverage line attribute table that is generated for the CORRIDOR coverage.

TABLE 3

| CORRIDOR Coverage Line Attribute Table | |
|---|---|
| Name | Description |
| Corridor-Id | Unique identifier |
| Fnode | From-node |
| Tnode | To-node |
| Lpoly | Left polygon |
| Rpoly | Right polygon |
| Length | Length of corridor |
| Lot-Id | Identifies the lot that contains the corridor |
| Status | F = corridor can be used; O = obstacle present |
| Used | Flag used during secondary routing |

The Fnode and Tnode attributes identify the from- and to-nodes of each CORRIDOR line; the Lpoly and Rpoly attributes identify the polygons on the left and right hand sides of the line; the Length attribute specifies the length of the CORRIDOR; the Corridor-Id attribute uniquely identifies the CORRIDOR; and the Lot-Id attribute identifies the lot in which the CORRIDOR is contained. In addition, referring to Table 1 above, the Corridor-Id attribute of the corresponding lot is set at this time to identify the CORRIDOR within that lot.

Referring again to FIGS. 4 and 5, the next preprocessing step 70 generates crossing coverage 56 that contains lines 57 representing street crossings, i.e., routing corridors for runs of secondary wiring that must cross streets. In particular, street crossings are created for each placement site 53, connecting it to the nearest placement site that is not on the same side of the street, i.e., that does not have the same SideStr attribute. This step preferably uses a built-in GIS function that finds the nearest point to a particular location. After the closest site to each particular placement site is found, a line is generated having those sites as terminal nodes. The resulting line attribute table for the crossing coverage is set forth below in Table 4.

TABLE 4

| CROSSING Coverage Line Attribute Table | |
|---|---|
| Name | Description |
| Crossing-Id | Unique identifier |
| Fnode | From-node |
| Tnode | To-node |
| Lpoly | Left polygon |
| Rpoly | Right polygon |
| Length | Length of crossing |
| Site1-Id | Site Id of the site where crossing originates |
| Site2-Id | Site Id of thw site where crossing ends |
| Status | F = crossing can be used; O = obstacle present |
| Used | Flag used during secondary routing |

This table contains attributes similar to those of the coverage CORRIDOR, and the Site1-Id and the Site2-Id attributes that identify the placement sites at either end of the crossing line.

As previously discussed, the preprocessing step of the present invention may include generation of an OBSTACLE coverage comprising polygons that represent obstacles within which placement sites cannot be located, and through which corridors cannot be run. If an OBSTACLE coverage has been created, then it would be used at this time to eliminate those placement sites, corridors, and crossings that intersect the obstacles. If an obstacle is found for a given site, corridor, or crossing, the status attribute of that element is set to indicate that an obstacle is present, and that the site or routing corridor cannot be used during subsequent design steps.

LOT CLUSTERING AND TRANSFORMER SITING

Referring again to FIG. 3, preprocessing step 34 is now complete, and the clustering of lots and the siting of transformers (step 36) may now commence. The transformer sites 53 identified in SITE coverage 52 identify only potential transformer placement sites. Determination of the actual sites at which the transformers will be located is an important step in the overall design problem. Transformer placement influences not only secondary routing, but, through the mechanism of constraint propagation, it influences the primary routing, as well as street lighting design and other features. Due to the sensitivity of the cost of an electrical plat design on the placement of transformers, this task is preferably performed interactively with a human operator.

The clustering/siting step begins with the clustering of lots. Each cluster comprises those lots that will be served by a single transformer. Before the start of the clustering process, a desirable cluster size, with upper and lower limits, must be provided by the operator. The average size of the cluster is generally based upon the average size of the anticipated loads, and the average size of the lots. The average cluster size should minimize the number of transformers that will be used, while maintaining tolerable voltage drops from the transformers to lot supply points 22 (FIG. 2) via the secondary wiring. Basically, the cluster size is determined by the maximum length of a given secondary conductor that for a given load, still results in acceptable static and dynamic voltage drop, for example three percent. "Rule of thumb" cluster sizes vary from 4 in low population areas with electric heating, to 14 in densely populated urban areas where alternate heating sources are available. Such rules of thumb may be used as a default or target cluster size in the present design method. By repeating the design process of the present invention using different cluster sizes, the cost benefits of different designs can be compared.

Figure 8:
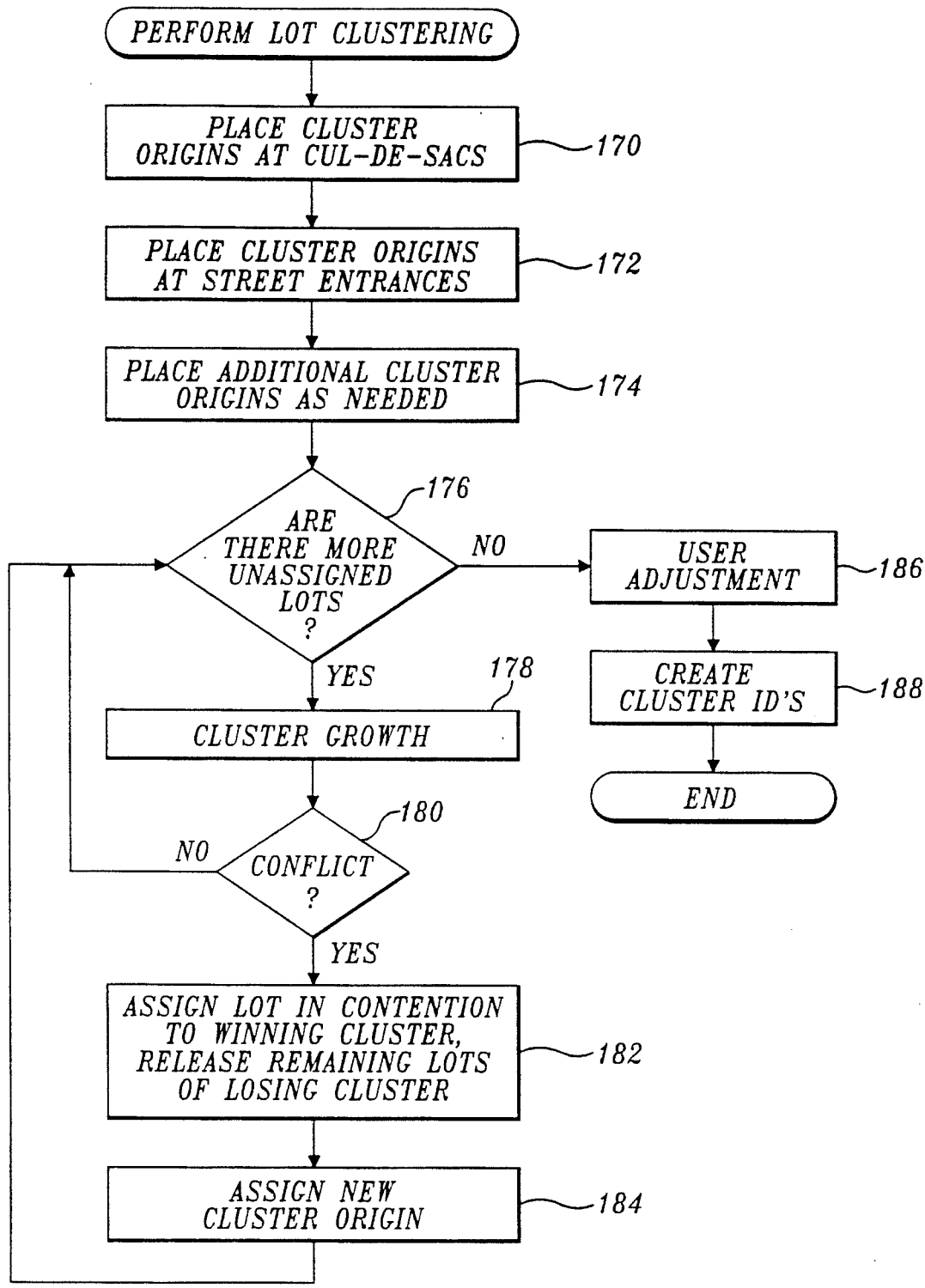
FIG. 8 is a flow chart illustrating lot clustering and transformer siting.
Figure 9:
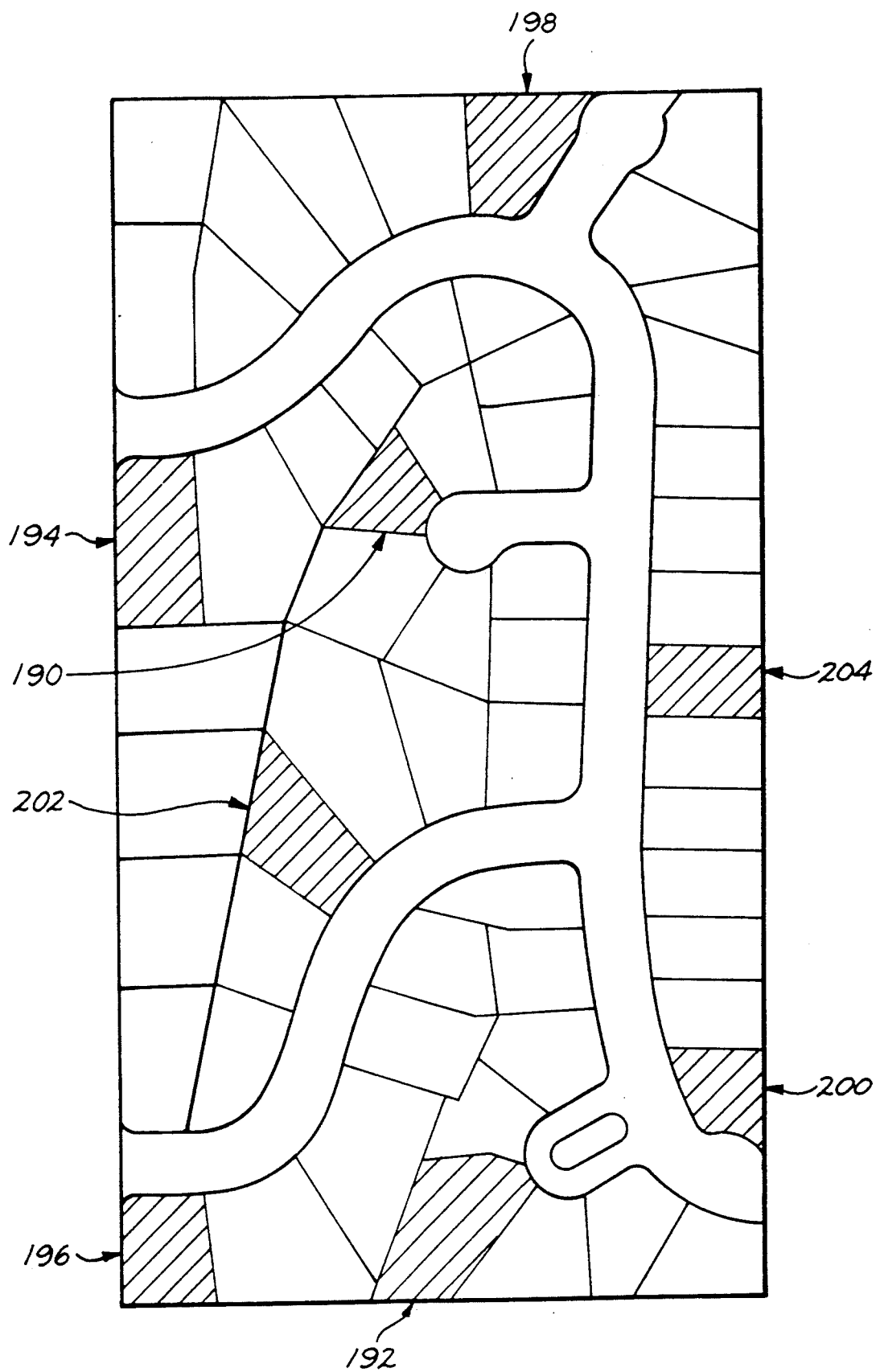
FIG. 9 is a map illustrating the selection of cluster origins.

The lot clustering step is described in greater detail in FIG. 8. The number of clusters to be created must first be determined, based upon the number of lots to be supplied with secondary power, and the average number of lots per transformer. The latter information is provided by the user, as described above. In the first step 170, one lot at the end of each cul-de-sac is chosen as a cluster origin. Referring to FIG. 9, lots 190 and 192 might be selected as cluster origins by this step. Step 172 then places additional cluster origins at the street entrances to the area to which electric power is to be supplied, one cluster origin per street entrance. On this basis, lots 194, 196, 198 and 200 might be selected as cluster origins. If further clusters are required, step 174 then locates additional cluster origins by finding those lots whose centroids are the furthest from the centroids of already established cluster origins. Since the locations of centroids are automatically available for polygons in a GIS, this technique is computationally relatively simple. On this basis, lots 202 and 204 might be selected as cluster origins.

Once the required number of cluster origins have been identified, a cluster growth and reconfiguration process commences at step 176. Step 176 determines whether there are more lots that have not yet been assigned to a cluster. At the beginning of the process, all lots other than cluster origins are in this category. Step 178 then adds one lot to each cluster. In a preferred embodiment, this is done by establishing a reference point at one of the transformer placement sites in the lot selected as the cluster origin. One then determines the path length from the reference point, through the available corridors and street crossings, to the nearest placement site in each other lot that has not yet been assigned to a cluster. The lot for which the shortest path exists is added to the cluster. This process is performed for each of the growing clusters, in each case using a reference point in the origin of that cluster. This technique finds the shortest path available, based upon available routing corridors. Although computationally long, this method provides an early pruning of designs that are unacceptable due to the absence of possible paths for conductor routing.

Alternate techniques for determining cluster growth are to use a fixed reference point at the centroid of each lot selected as a cluster origin, or to use a moving reference point at the centroid of the expanding cluster. For either of these approaches, the closeness of candidate lots to the reference point is measured by determining the distance between the reference point and the centroid of the candidate lot, rather than by following existing routing corridors. However, the clustering is not done according to actual routing requirements, and the first mentioned approach will therefore generally be preferred.

In FIG. 8, step 180 checks to see if the cluster growth process has attempted to add any lot to two different clusters. If not, then the iteration repeats beginning with step 176. If so, then the preferred conflict resolution technique is outlined in step 182. In this technique, the lot in contention is added to the cluster having the closest reference point, and the other cluster is dissolved, making all lots previously in the other cluster available for reassignment. Since this process eliminates one cluster, an origin for a new cluster is selected in step 184. The lot chosen as the origin for the new cluster may simply be the lot whose centroid is farthest from the centroids of origins of existing clusters.

It should be mentioned that other merging and reconfiguration techniques may be used. For example, in the case where the distance to a candidate lot is measured "line of sight" from centroid to centroid, it may be preferable to resolve conflicts by merging all lots in the two conflicting clusters into a single cluster.

Once the automatic clustering steps have been completed, and all lots have been assigned to a cluster, the configuration is presented to the user in step 186, and the user is invited to make adjustment in the clustering determined by the computer. Once any adjustments have been made, cluster IDs are assigned, and are stored as the Cluster attribute in the feature attribute table of the LOT coverage (Table 1). The clustering process is then complete.

The next portion of the clustering/siting step is to identify the actual sites at which the transformers and handholes will be located. This is done based primarily on the clustering process just completed. In particular, in on preferred embodiment, transformers are sited by finding the "center of gravity" of each cluster, and then selecting the available transformer placement site 53 (FIG. 4) closest to such center of gravity. The results of the transformer placement are recorded by updating the status attribute in the site coverage (see Table 2, above). To determine the center of gravity of a cluster, a load point is assumed to be located at the centroid of each lot in the cluster. The coordinates of the center of gravity of a cluster ($x_{cg}, y_{cg}$) may be determined as follows:

$$x_{cg} = \frac{\sum_{i=1}^{n} x_i}{n} \quad (1)$$

$$y_{cg} = \frac{\sum_{i=1}^{n} y_i}{n} \quad (2)$$

where $x_i$ and $y_i$ are the coordinates of the centroid of the n lots in the cluster.

Equations (1) and (2) above provide equal weighing to all lots in the cluster, and therefore are suitable when all lots will draw about the same load, or when load data is unavailable. For a design for a plat in which the lots are of varying sizes, the coordinates $x_i$ and $y_i$ in Equations (1) and (2) can be weighted by the areas of the respective lots. Where the projected loads are known for each lot, the lot coordinates could also be weighted by such loads. For these cases, the denominators of Equations (1) and (2) would be the total areas of the lots, or the total loads.

The next step is the placement of handholes. The handhole placing strategy is based upon the rule that each side of the street in a cluster must have one connecting device, either a transformer or a handhole. Thus this step involves identifying, in each cluster, any group of lots that shares a side of the street attribute, but does not include a transformer. For each such side of the street, a site for the handhole is determined as the terminal node of the line 57 of the crossing coverage that originates at the transformer placement site. For those cases in which there are more than two sides of the street in a cluster, each additional handhole is placed on the site that is nearest to the load center of gravity, for lots that share the same side of the street attribute. A handhole site is identified using the value H for the status attribute in the site coverage point attribute table. Once handhole sites have been identified, the direction (left or right) from each lot to the distribution device on the same side of the street is determined, and stored as the SODD attribute in the lot coverage (Table 1).

The transformer and handhole placement are presented to the user, for adjustment if required. Any adjustments made by the user are reflected by upgrading the appropriate attribute tables.

MAPPING

Referring again to FIG. 3, the spatial processing portion of the design process is now complete, and the next step is mapping 38 of the information in GIS database 32 into expert system objects 40. A preferred form of an expert system object is schematically illustrated by object 220 shown in FIG. 10. Object 220 represents a lot 222 that includes a street frontage line 224, and a corridor 226 extending parallel to frontage line 224. A left placement site 230 and a right placement site 232 are located along corridor 226, and the placement sites are connected to sites 228 and 238 on the opposite side of the street by crossings 234 and 236 respectively.

Figures 10, 11:
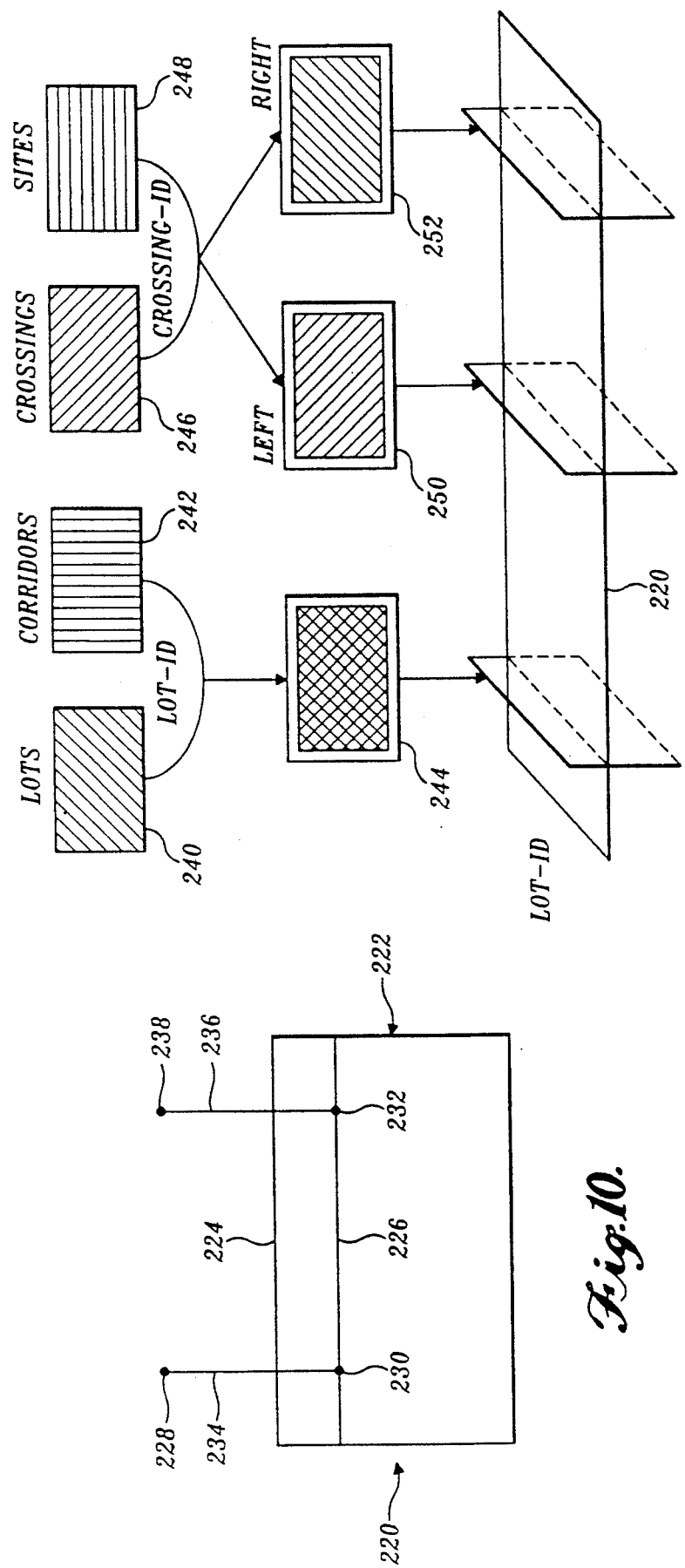
FIG. 10 is a schematic representation of an expert system lot object.
FIG. 11 is a pictorial illustration of the mapping procedure.

A preferred technique for creating object 220 from the existing GIS coverages is outlined in FIG. 11. One begins by combining lot coverage 240 with corridor coverage 242, using the common attribute Lot-ID, to create a composite file 244 that represents each lot, including the corridor passing through the lot. In a similar manner, crossing coverage 246 is combined with site coverage 248, using the common attribute Crossing-ID, to create left and right composite files 250 and 252 respectively. Referring to FIG. 10, file 250 represents the left placement site 230 and the corresponding left crossing 234 of each of the lots, while right file 252 represents right placement site 232 and the corresponding right crossing 236 of each lot. Files 244, 250, and 252 are then combined, based upon the common attribute Lot-ID, to create a plurality of objects 220, one per lot.

EXPERT SYSTEM PROCESSING

Secondary routing and sizing are performed using a rule-based, expert system, that gives results based upon mimicking the problem solving reasoning process of an expert designer. A preferred expert system for purposes of the present invention is the Nexpert System available from Neuron Data. The Nexpert System includes a rule-based programming language, editors for rule and data structures, and a graphical interface for displaying rules and data.

The rules used for the purpose of the present invention preferably have a symmetric form; i.e., the same rule may be used for both backward chaining or forward chaining. In the Nexpert System, the rules have the following format:

IF (conditions) THEN (hypothesis) AND DO (actions) The hypothesis of the rule is a pseudo-boolian property assigned by that rule. The value of that property can be TRUE, FALSE, UNKNOWN, or NOT-KNOWN, depending upon the result of the rule evaluation. The rule evaluation process consists of checking the value of the left hand side conditions. If all the conditions are satisfied, the hypothesis is true. If one or more of the conditions are not satisfied, then the hypothesis is false. If the value of at least one condition is not known at the time that a rule is evaluated, the hypothesis value is not known. Finally, the rule hypothesis value is unknown if that rule has not yet been evaluated.

A set of rules suitable for performing the secondary routing and sizing steps of the present invention is set forth in the attached APPENDIX (not reproduced here, but is available in the application file). These rules are but one example of rules that could be used for implementing the invention. In many cases, it would be desirable to construct several different sets of rules, each based upon different design strategy, in order to compare the results of the different strategies. Such an approach permits different rule sets to be used, depending upon the nature of the design problem, the jurisdiction in which the area is located, etc.

The rules set forth in the APPENDIX implement a strategy based upon the principle that each lot should be connected to the distribution device (transformer or handhole) that is on its own side of the street. If there is no available path between the lot and the distribution device on the same side of the street, a route must cross to the opposite side of the street, using an available crossing, and proceed to find a way to the proper connecting device. In addition, the rules must be designed to satisfy standard practices employed by utility designers. If a suitable route cannot be found, or a technical requirement cannot be met, the user is prompted for his/her action or suggestion.

This simple principle of lot connection is valid for each lot in each cluster, so that the same set of rules can be used for every lot. Clusters, and lots within each cluster, are processed sequentially using the data in the expert system objects. During the processing, starting from the lot that has to be connected, whenever a route uses a particular corridor or street crossing, the length of that element (corridor or crossing) is added to the overall length of conductor. At the end of the processing for the lot, the final result in the form of secondary conductor length, and a flag showing that this lot has been successfully connected, is written into the expert system object for that lot.

After the length of the conductor for each lot is found, it is used with the anticipated load size to determine secondary conductor size. Transformers may also be sized, based upon the total load anticipated for the entire cluster.

REMAPPING

Referring again to FIG. 3, once the expert system processing steps 42 and 44 have been completed, the expert system's objects are remapped in step 46 back into GIS database 32. As a result of the remapping, the CondLength and CondSize attributes of the lot coverage are updated to indicate the length and size of the secondary conductor to each lot. In addition, in the corridor and crossing coverages, the Used flag is set for each crossing or coverage used for secondary wiring. This remapping facilitates the display of routing corridor for which it will be necessary to dig trenches.

While preferred embodiments of the invention have been described, variations will be apparent to those skilled in the art. Accordingly, the scope of the invention is to be determined by reference to the claims.

The embodiments of the invention in which an exclusive property or privilege is claimed are defined as follows:

1. A method for designing a distribution system for distributing a utility, to a plurality of lots in an area, the method comprising the steps of:
   providing lot data that defines the lots geographically, and storing the lot data in a computer in a geographic information system (GIS);
   computer processing the lot data to produce actual siting data specifying a plurality of placement sites in the area for distribution devices, and storing the actual siting data in the computer;
   mapping the lot and actual siting data into equivalent expert system data in a format suitable for processing by an expert system; and
   computer processing the expert system data using an expert system to produce routing data specifying, for each lot, a route along which the lot can be connected to a distribution device.

2. The method of claim 1, wherein the step of computer processing the lot data comprises grouping the lots into clusters such that the lots in each cluster can be efficiently supplied by a single distribution device, and selecting one or more distribution device sites within each cluster.

3. The method of claim 2, wherein the grouping step comprises the step of selecting a lot to serve as an origin for each cluster.

4. The method of claim 3, wherein the grouping step comprises sequentially associating lots with cluster origins by determining the distance between a lot and a reference point representing the cluster.

5. The method of claim 2, wherein the step of selecting one or more distribution device sites within each cluster comprises deteming the center of gravity of the lots comprising the cluster.

6. The method of claim 1, wherein the step of computer processing the lot data comprises defining potential routing corridors and potential placement sites within the area, to produce potential site and potential routing data, and storing the potential site and potential routing data in the computer.

7. The method of claim 6, wherein the area includes one or more streets, and wherein the potential routing data comprises corridor data specifying potential routes through the lots, and crossing data specifying potential routes that cross a street.

8. The method of claim 7, wherein the lot, potential site, corridor, and crossing data are stored in four separate coverages in the GIS.

9. The method of claim 1, wherein the expert system data comprises a plurality of expert system objects, each object corresponding to one of the lots.

10. The method of claim 1, wherein the step of processing the expert system data comprises the additional step of producing sizing data for each lot.

11. The method of claim 1, wherein the utility comprises an electrical utility, wherein the distribution devices comprise transformers for converting primary voltage into secondary voltage, and wherein the routing data specifies, for each lot, a route along which the lot can be connected to a distribution device via secondary wiring.

12. The method of claim 11, wherein the step of computer processing the lot data comprises grouping the lots into clusters such that the lots in each cluster can be efficiently supplied by a single transformer, and selecting a transformer site within each cluster.

13. The method of claim 12, wherein the area includes one or more streets, and wherein the step of computer processing the lot data further comprises producing side of the street data for each cluster indicating whether or not lots in the cluster are on the same or different sides of the street, and, if there are lots not on the same side of the street as the transformer site, selecting a handhole site for such lots.

14. The method of claim 12, wherein the step of selecting a transformer site within each cluster comprises determining the center of gravity of the lots comprising the cluster.

15. The method of claim 11, wherein the step of computer processing the lot data comprises defining potential routing corridors and potential placement sites within the area, to produce potential site and potential routing data, and storing the potential site and potential routing data in the computer.

16. The method of claim 15, wherein the area includes one or more streets, and wherein the potential routing data comprises corridor data specifying potential routes through the lots, and crossing data specifying potential routes that cross a street.

17. The method of claim 11, wherein the expert system data comprises a plurality of expert system objects, each object corresponding to one of the lots.

18. The method of claim 11, wherein the step of processing the expert system data comprises the additional step of producing sizing data for each lot indicating the size of the secondary wiring for the lot.

* * * * *